United States Patent
Yang et al.

(10) Patent No.: US 8,246,234 B2
(45) Date of Patent: Aug. 21, 2012

(54) PORTABLE ELECTRONIC DEVICE

(75) Inventors: Mu-Wen Yang, Taipei (TW); Chih-Chiang Chang, Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 278 days.

(21) Appl. No.: 12/755,486

(22) Filed: Apr. 7, 2010

(65) Prior Publication Data

US 2010/0315820 A1 Dec. 16, 2010

(30) Foreign Application Priority Data

Jun. 10, 2009 (CN) .......................... 2009 1 0303131

(51) Int. Cl.
*F21V 7/04* (2006.01)

(52) U.S. Cl. .......................................... 362/616; 362/85

(58) Field of Classification Search .......... 362/600–603, 362/606–608, 610–613, 615, 628, 632–634, 362/97.1–97.4, 26–30, 616, 85
See application file for complete search history.

(56) References Cited

U.S. PATENT DOCUMENTS

| | | | | |
|---|---|---|---|---|
| 2,259,910 A | * | 10/1941 | Rylsky | 362/26 |
| 4,770,499 A | * | 9/1988 | Kobayashi et al. | 349/67 |
| 5,984,485 A | * | 11/1999 | Poli et al. | 362/26 |
| 6,318,872 B1 | * | 11/2001 | Kato et al. | 362/26 |
| 6,398,379 B1 | * | 6/2002 | Imai | 362/24 |
| 2006/0285354 A1 | * | 12/2006 | Birman et al. | 362/602 |

FOREIGN PATENT DOCUMENTS

| CN | 1252200 A | 5/2000 |
|---|---|---|
| CN | 1749830 A | 3/2006 |

* cited by examiner

*Primary Examiner* — Julie Shallenberger

(74) *Attorney, Agent, or Firm* — Altis Law Group, Inc.

(57) ABSTRACT

A portable electronic device comprises a housing, a first light guiding member, a display and a second light guiding member. The housing has a main body, an opening defined through the main body, a frame protrudes from the main body surrounding the opening, and a trough is defined through the frame. The first light guiding member has a main body mounted in the opening of the housing. The display is mounted with the first light guiding member in the housing. The second light guiding member is accommodated in the trough. The first light guiding member further includes a peripheral wall protruding from the main body thereof, the peripheral wall is located between the main body of the first light guiding member and the display, and a passage is defined between the peripheral wall and the second light guiding member.

17 Claims, 4 Drawing Sheets

PORTABLE ELECTRONIC DEVICE

CROSS-REFERENCE TO RELATED APPLICATIONS

This application is related to co-pending U.S. patent application 12/755,488, entitled "PORTABLE ELECTRONIC DEVICE", by Yang et al. The application has the same assignee as the present application and has been concurrently filed herewith. The above-identified applications are incorporated herein by reference.

BACKGROUND

1. Technical Field

The exemplary invention generally relates to housings and portable electronic devices using the housings.

2. Description of Related Art

Portable electronic devices with wireless communication modules, such as mobile phones, are widely used in work, everyday life, and even entertainment. Consumers consider purchase mobile phones not only because of their communication capabilities, but also because of their appearances.

Typically, to improve the external appearance and quality of an outer housing of the portable electronic device, a light emitting member, such as a LED is mounted to an outer surface of the housing to emit an attractive light around the housing. However, light emitting members for improving the external appearance of the housing will consume additional power from the portable electronic device.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary housing and method making the housing. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
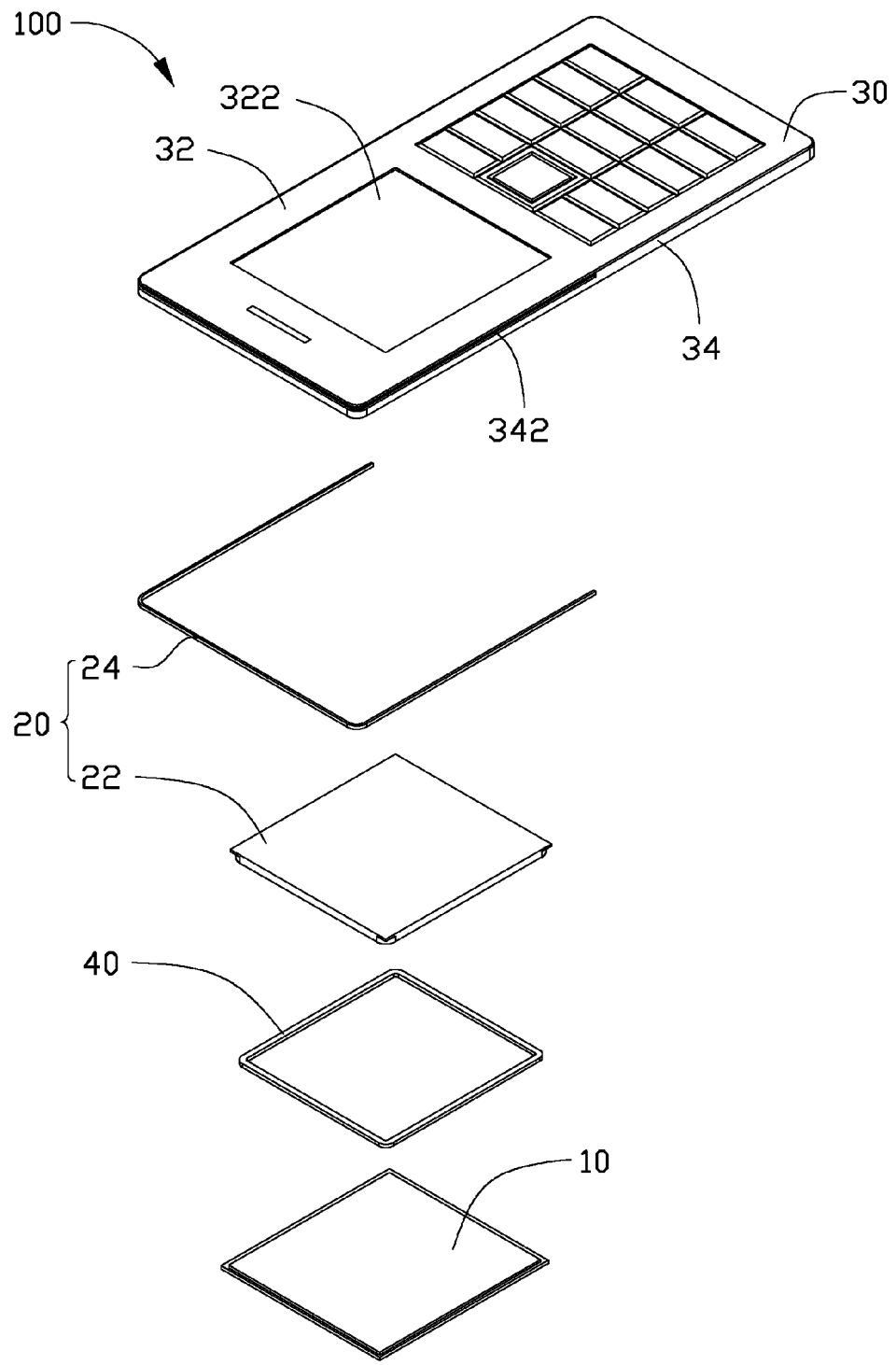
FIG. 1 is an exploded view of an exemplary embodiment of a portable electronic device including a display, a light guiding module, a housing and a gasket.
Figure 2:
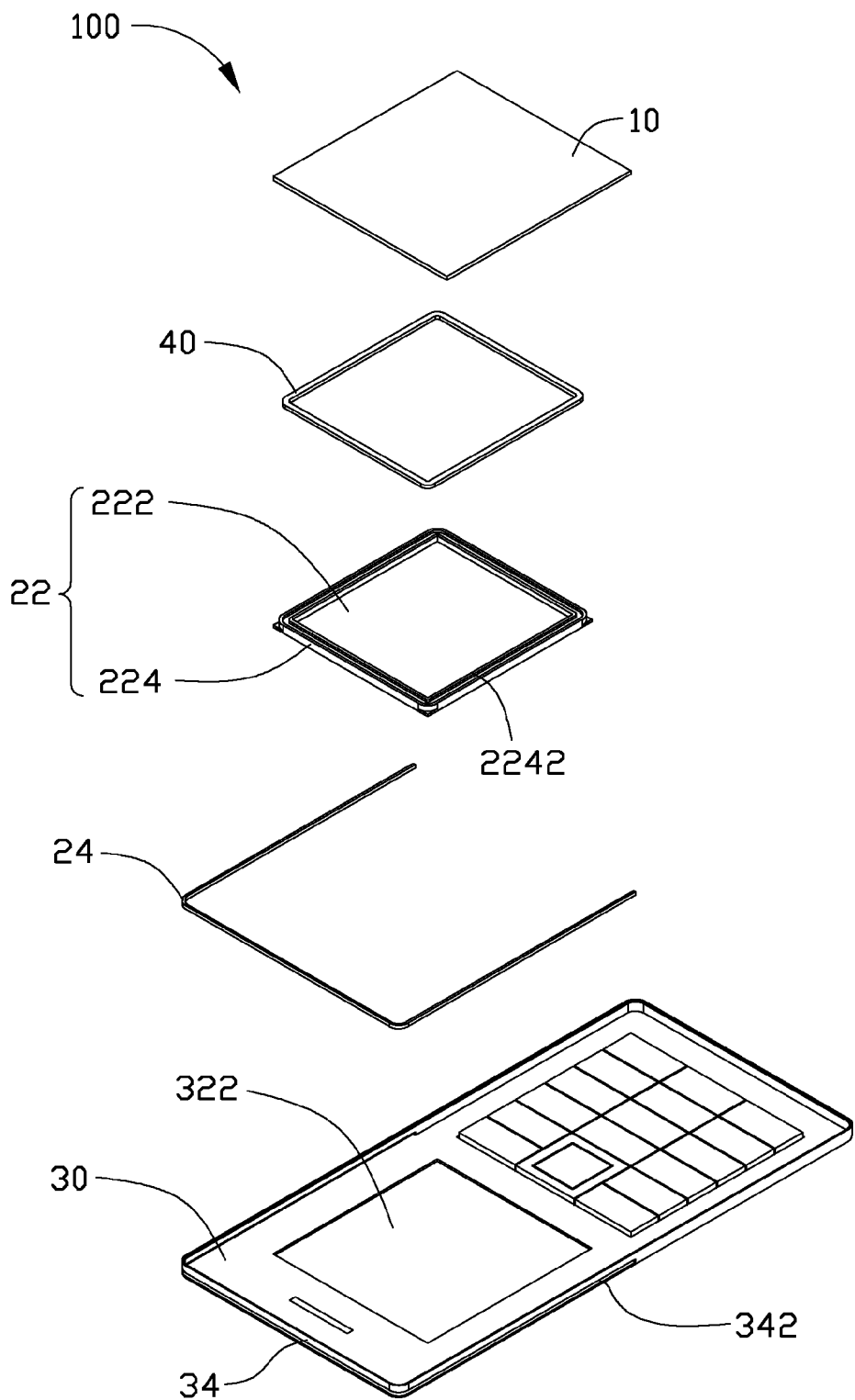
FIG. 2 is similar to the portable electronic device shown in FIG. 1, but viewing from another aspect.

Referring to FIGS. 1 and 2, an exemplary portable electronic device 100 includes a display 10, a light guiding module 20 and a housing 30. The light guiding module 20 and the display 10 are both mounted on the housing 30, to make the housing 30 emit a light that improves the outer appearance of the housing 30.

The display 10 may be any traditional display, such as LCD, LED. The display 10 displays the data for the portable electronic device 100. According to the invention, the display 10 also acts as a light source for illuminating the light guiding module 20, so that the portable electronic device 100 does not need an additional light emitting member for improving the outer appearance of the housing 30.

The light guiding module 20 includes a first light guiding member 22 and a second light guiding member 24. The first light guiding member 22 is transparent or translucent so that the light transmitted to the first light guiding member 22, such as from the display 10, can pass through the first light guiding member 22 or be guided to an outer surface of the first light guiding member 22. The first light guiding member 22 includes a main body 222 and a peripheral wall 224 protruding from an outer peripheral edge of the main body 222. The main body 222 acts as a light guiding portion to guide the light from the display 10 towards an outer surface thereof for user viewing and also generally corresponds in shape and size to the display 10 for protecting the display 10 from damage. In this embodiment, the main body 222 is actually a display protecting lens of the portable electronic device 100. The peripheral wall 224 has a groove 2242 defined in a distal end thereof surrounding the main body 222. The groove 2242 is used to accommodate a gasket 40 therein. The second light guiding member 24 may be any of shape, such as U-shaped in this embodiment for example. The second light guiding member 24 may also be transparent or translucent so that the light transmitted to the second light guiding member 24, such as from the first light guiding member 22, can pass through the second light guiding member 24 or be guided towards an outer surface of the second light guiding member 24. The first light guiding member 22 and the second light guiding member 24 can be made of one or more materials selected from a group consisting of polyvinyl chloride (PVC), polycarbonate, polystyrene, and any other thermoplastic resins.

The housing 30 includes a main body 32 of any shape. The housing 30 has an opening 322 defined through the main body 32 corresponding to the main body 222 of the first light guiding member 22 and a frame 34 protruding from the main body 32 surrounding the opening 322. The housing 30 further includes a trough 342 (see FIG. 4) defined through the frame 34 around the opening 322. The trough 342 corresponds to the second light guiding member 24 and accommodates and retains the second light guiding member 24 therein.

Figure 3:
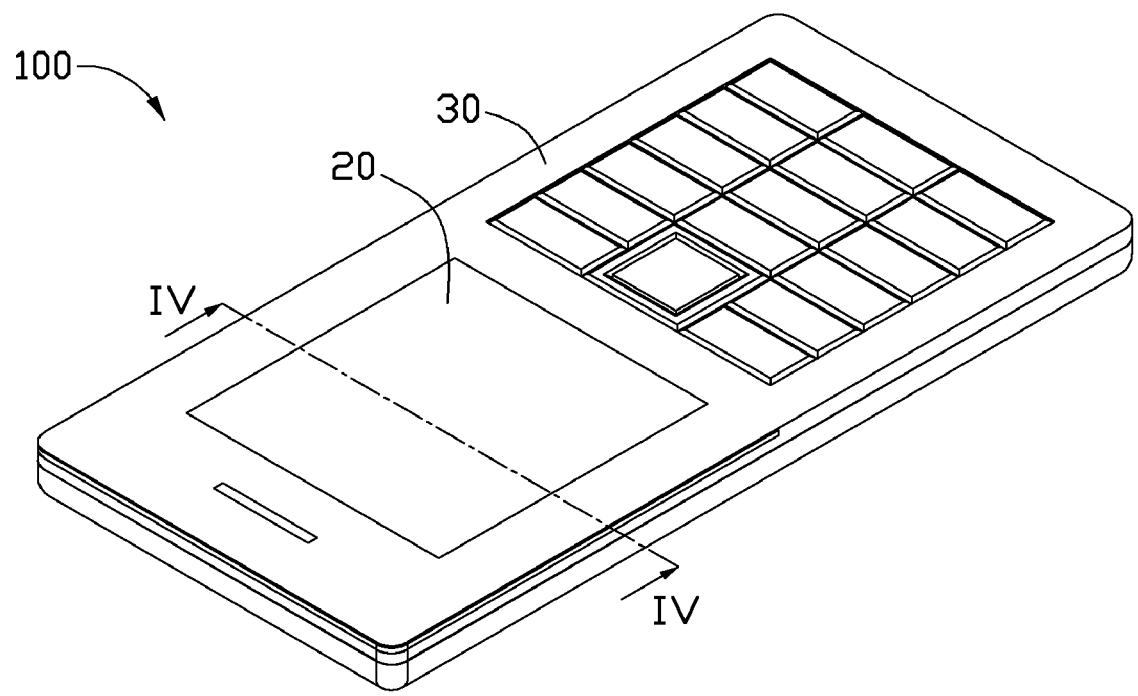
FIG. 3 is an assemble view of the portable electronic device shown in FIG. 1.
Figure 4:
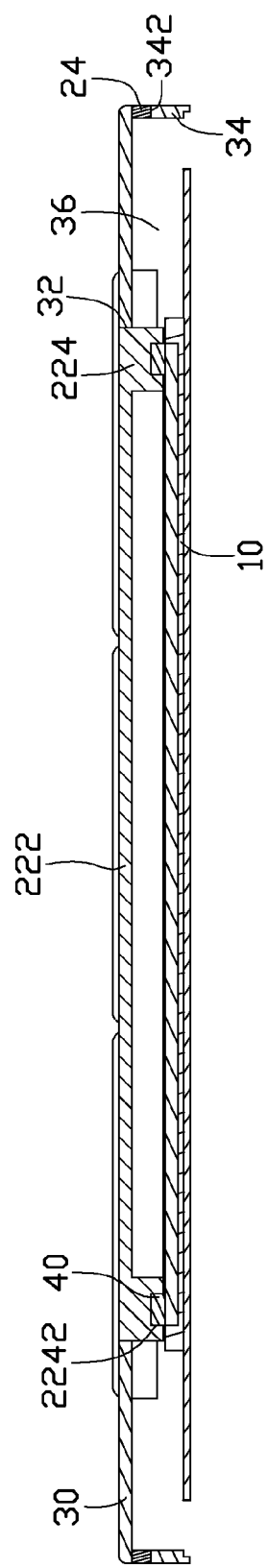
FIG. 4 is an enlarged and exploded view of the portable electronic device shown in FIG. 3.

Referring to FIGS. 3 and 4, during assembly: first, the first light guiding member 22 is accommodated and retained (e.g., hot-melted) in the opening 322 of the housing 30. The peripheral wall 224 of the first light guiding member 22 is located in the housing 30. Secondly, the second light guiding member 24 is firmly accommodated in the trough 342 of the housing 30. A passage or space 36 is formed between the first light guiding member 22 and the second light guiding member 24. Then, the gasket 40 is received in the groove 2242 of the first light guiding member 22, with a portion of the gasket 40 exposed outside the groove 2242. Finally, the display 10 is mounted on the first light guiding member 22 with gasket 40 compressed between the first light guiding member 22 and the display 10, so that the first light guiding member 22 is firmly and hermetically sealed with the display 10 by the compressed gasket 40.

In use, most of the light emitted by the display 10 is transmitted through the main body 222 of the first light guiding member 22 for user viewing of device data, etc. The rest of the light emitted by the display 10 is transmitted to and guided by the peripheral wall 224 of the first light guiding member 22 until transmitted through the passage 36, and reaching to and guided by the second light guiding member 24. Thus, the at least translucent second light guiding member 24 is illuminated to externally decorate the housing 30, especially when the second light guiding member 24 is made of colorful material, the second light guiding member 24 would emit a light therethrough according to the colorful material.

The second light guiding member 24 and the housing 30 may be integrally molded together.

The main body 222 of the first light guiding member 22 acts as a light guiding portion such that light emitted from the display 10 may be guided to users by the main body 222. The peripheral wall 224 of the first light guiding member 22 acts as a light-transmitted portion such that light emitted from the display 10 may be transmitted through the peripheral wall 224, and go through the passage 36 and guided towards the outside of the electronic device 100 by the second guiding member 24.

The passage 36 may be omitted, that is the peripheral wall 224 directly contacts with the second guiding member 24 or is disposed adjacent to the second guiding member 24.

Even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
   a housing having a main body, an opening defined through the main body, a frame protruding from the main body surrounding the opening, and a trough defined through the frame;
   a first light guiding member having a main body mounted in the opening of the housing;
   a display mounted with the first light guiding member in the housing; and
   a second light guiding member accommodated in the trough;
   wherein the first light guiding member further includes a peripheral wall protruding from the main body thereof, the peripheral wall located between the main body of the first light guiding member and the display, and a passage is defined between the peripheral wall and the second light guiding member.

2. The portable electronic device as claimed in claim 1, wherein the second light guiding member and the housing are integrally molded together.

3. The portable electronic device as claimed in claim 1, wherein the first light guiding member is made of one or more materials selected from a group consisting of polyvinyl chloride, polycarbonate, polystyrene.

4. The portable electronic device as claimed in claim 1, wherein the second light guiding member is made of one or more materials selected from a group consisting of polyvinyl chloride, polycarbonate, polystyrene.

5. The portable electronic device as claimed in claim 1, wherein the first light guiding member further includes a groove defined in a distal end of the peripheral wall surrounding the main body thereof; the portable electronic device further includes a gasket accommodated in the groove.

6. A portable electronic device, comprising:
   a housing having a main body, an opening defined through the main body, a frame protruding from the main body surrounding the opening, and a trough defined through the frame;
   a display protecting lens having a main body mounted in the opening of the housing;
   a display mounted with the display protecting lens in the housing; and
   a light guiding member accommodated in the trough;
   wherein the display protecting lens further includes a peripheral wall protruding from the main body thereof, the peripheral wall located between the main body of the display protecting lens and the display, and a passage is defined between the peripheral wall and the light guiding member.

7. The portable electronic device as claimed in claim 6, wherein the light guiding member and the housing are integrally molded together.

8. The portable electronic device as claimed in claim 6, wherein the light guiding member is made of one or more materials selected from a group consisting of polyvinyl chloride, polycarbonate, polystyrene.

9. The portable electronic device as claimed in claim 6, wherein the peripheral wall is made of one or more materials selected from a group consisting of polyvinyl chloride, polycarbonate, polystyrene.

10. The portable electronic device as claimed in claim 6, wherein the display protecting lens further includes a groove defined in a distal end of the peripheral wall surrounding the main body thereof; the portable electronic device further includes a gasket accommodated in the groove.

11. A portable electronic device, comprising:
    a housing having a main body, the main body having an opening defined therethrough;
    a first light guiding member mounted in the opening of the housing, the first light guiding member having a light guiding portion and a light-transmitted portion protruding from the light guiding portion;
    a display being assembled to the first light guiding member, the light-transmitted portion being sandwiched between the light guiding portion and the display such that a portion of the light emitted from the display is guided towards outside the housing by the light guiding portion and a second portion of light emitted from the display is transmitted through the light-transmitted portion; and
    a second light guiding member assembled to a periphery of the main body to guide said second light from the light-transmitted portion towards outside the housing.

12. The portable electronic device as claimed in claim 11, wherein the second light guiding member and the housing are integrally molded together.

13. The portable electronic device as claimed in claim 11, wherein the second light guiding member is made of one or more materials selected from a group consisting of polyvinyl chloride, polycarbonate, polystyrene.

14. The portable electronic device as claimed in claim 11, wherein the light-transmitted portion is made of one or more materials selected from a group consisting of polyvinyl chloride, polycarbonate, polystyrene.

15. The portable electronic device as claimed in claim 6, wherein the first light guiding member further includes a groove defined in a distal end of the light-transmitted portion; the portable electronic device further includes a gasket accommodated in the groove.

16. The portable electronic device as claimed in claim 11, wherein the housing further includes a frame protruding from a periphery of the main body surrounding the opening, and a trough is defined through the frame, the second light guiding member is received in the trough.

17. The portable electronic device as claimed in claim 12, wherein a space is formed between the second light guiding member and the light-transmitted portion of the first guiding member such that said second light transmitted from the light-transmitted portion pass through the space to be guided towards outside of the portable electronic device by the second guiding member.

* * * * *